United States Patent [19]
Kohus

[11] Patent Number: 5,105,576
[45] Date of Patent: Apr. 21, 1992

[54] MODULAR FISHING FLOAT SYSTEMS

[76] Inventor: Louis M. Kohus, 2000 Ford Cir., Milford, Ohio 45150-2787

[21] Appl. No.: 692,123

[22] Filed: Apr. 26, 1991

[51] Int. Cl.⁵ .......................................... A01K 93/00
[52] U.S. Cl. .............................. 43/44.92; 43/44.87
[58] Field of Search ............... 43/44.92, 44.87, 44.91, 43/44.9, 44.95, 17.5, 43.1

[56] References Cited

U.S. PATENT DOCUMENTS

| | | | |
|---|---|---|---|
| 2,693,049 | 11/1954 | Atton | 43/44.9 |
| 3,736,690 | 6/1973 | Witkowski | 43/44.9 |
| 3,747,257 | 7/1973 | Olsen | 43/44.87 |
| 3,800,461 | 4/1974 | Jacobi | 43/44.92 |
| 4,109,405 | 8/1978 | Ito | 43/17.5 |
| 4,461,114 | 7/1984 | Riead | 43/43.14 |

Primary Examiner—Richard K. Seidel
Assistant Examiner—Chuck Y. Mah
Attorney, Agent, or Firm—Charles R. Wilson

[57] ABSTRACT

A modular fishing float system comprises a series of interchangeable top float components and bottom float components of varying lengths and weights. The top and bottom float components have attaching means which allows their assembly together to form a full float. The fisherman is able to select a particular top float component and a particular bottom float component for assembly together dependent on various conditions such as water conditions, weather conditions and anticipated fish size.

8 Claims, 4 Drawing Sheets

MODULAR FISHING FLOAT SYSTEMS

This invention relates to fishing floats. More particularly, the invention relates to modular fishing float systems which are capable of being assembled into several floats of varying sizes dependent on the fishing conditions.

Float fishing is a very popular form of fishing. It can provide a very relaxed day. The fisherman rigs his fishing line with stop bead, float, sinker weight and hook. The float is positioned on the line according to the desired depth of fishing.

Selection of the float itself is made by the experienced fisherman only after a number of factors are considered. If the hook and associated gear is being cast a number of feet from the shoreline or boat, then visibility of that part of the float above water is important. A brightly colored float or a long float which extends several inches above the water surface will more likely be chosen. Turbulent water conditions due to wind will dictate the use of a float which is relatively insensitive to such movements. Normally, this means the use of a float with a relatively heavy weight bottom to force the float to sit upright in the water. Even the size of fish likely to be caught influences the float which is selected. A larger or stronger fish will very noticeably move the float when it strikes, even a heavy float. A smaller or weaker fish will only slightly move the float unless the float is very sensitive.

It is not unusual for the fisherman to use several different floats in a day. Different floats will be used as weather conditions change and as the fisherman becomes more acclimated to the water conditions and fish. Changing known floats on a fishing line is cumbersome. It certainly takes time and detracts from what seems like precious little time. Having to store and carry several different floats of varying sizes and weights which may be needed are also problems.

In accord with a demonstrated need, there has been developed a fishing float system which has tremendous versatility. The float system is capable of giving the fisherman a wide choice in float length and weight. Disadvantages of prior art floats are not experienced with the new fishing float systems.

SUMMARY OF THE INVENTION

A modular fishing float system has a series of interchangeable top float components and bottom float components. The float components are of varying sizes for assembly together to form a full fishing float. A set of top float components has at least two different lengths with each component having attaching means to mate the bottom float component. The bottom float component also is present as a set of at least two different lengths with complimentary attaching means to mate the top float component. The bottom component preferably contains ballast to cause the assembled full float to sit upright in water.

BRIEF DESCRIPTION OF THE DRAWINGS

FIG. 4 is a top view of the float of FIG. 2 showing a rounded head in detail.

FIG. 5 is a view of an inside area of a cap used on the float of FIG. 2.

DETAILED DESCRIPTION OF THE INVENTION

Figure 1:
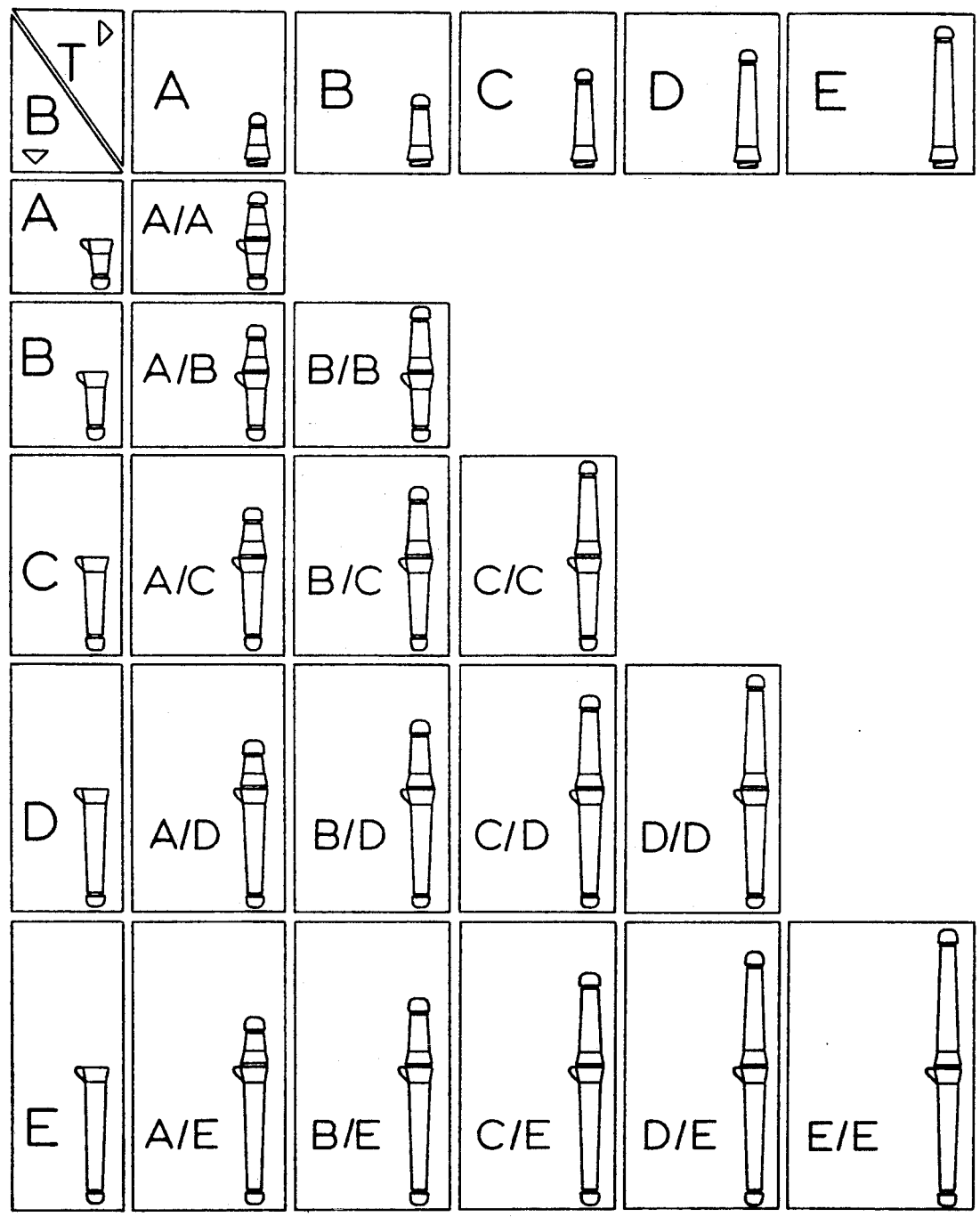
FIG. 1 is a table showing the number of float length combinations possible from a set of five top float components and five bottom float components of the invention.

The fishing float system of the invention is a modular system comprised of two sets of interchangeable float components. With reference to the table of FIG. 1, there is shown a fishing float system having five top float components (T) of different lengths designated as A-E and five bottom float components (B) of different lengths designated as A-E. From the available components, there is shown a possibility of fifteen different lengths of full floats. A description of the two float component individual lengths and length differences as well as the float component constructions are discussed in the paragraphs which follow.

It should be understood that modular fishing float systems of the invention are possible with as few as two top float components and two bottom float components. Preferably, however, the fishing float system has three to five top float components and three to five bottom float components. This preferred number of components gives the average fisherman a sufficiently wide choice of float component combinations to form full floats which are likely to suit his needs.

The top float component ranges in length from about one inch to about ten inches, preferably from about two inches to about eight inches. Further, there is an about one to about four inch difference in length in each component of the set, preferably an about one inch to about two inch difference. The top float component also has attaching means to mate the bottom float component. A highly preferred attaching means is a set of threads, either internal or external, to threadably mate the bottom float component.

The bottom float component also ranges in length from about one inch to about ten inches, preferably from about two inches to about eight inches. As with the set of top float components, each bottom float component in the set has an about one inch to about four inches difference in length, preferably about one inch to about two inches difference. Matching attaching means on each of the bottom float components mate the top float component. Most preferably, the bottom float component has a set of external threads on one end to threadably mate internal threads on the top float component.

The bottom float components are capable of holding ballast. The ballast is needed to cause the full float to sit upright in water. Sand or another dense granular material can be used as the ballast. Preferably, a high density metal weight such as steel or lead is shaped to snugly fit into the bottom float component to minimize movement during use.

In a preferred embodiment of the invention, the bottom component is comprised of a shell mid-portion and a lower compartment designed to hold the ballast. The shell and lower compartment are preferably capable of being attached together by the use of internal and external threads. The lower compartment is preferably one size and the shell is present in varying sizes so that the lower compartment and shell together have a length above defined for the bottom float component. In this embodiment, only a single lower compartment with ballast is needed, it being usable with the several different sized shells in the set.

Figure 2:
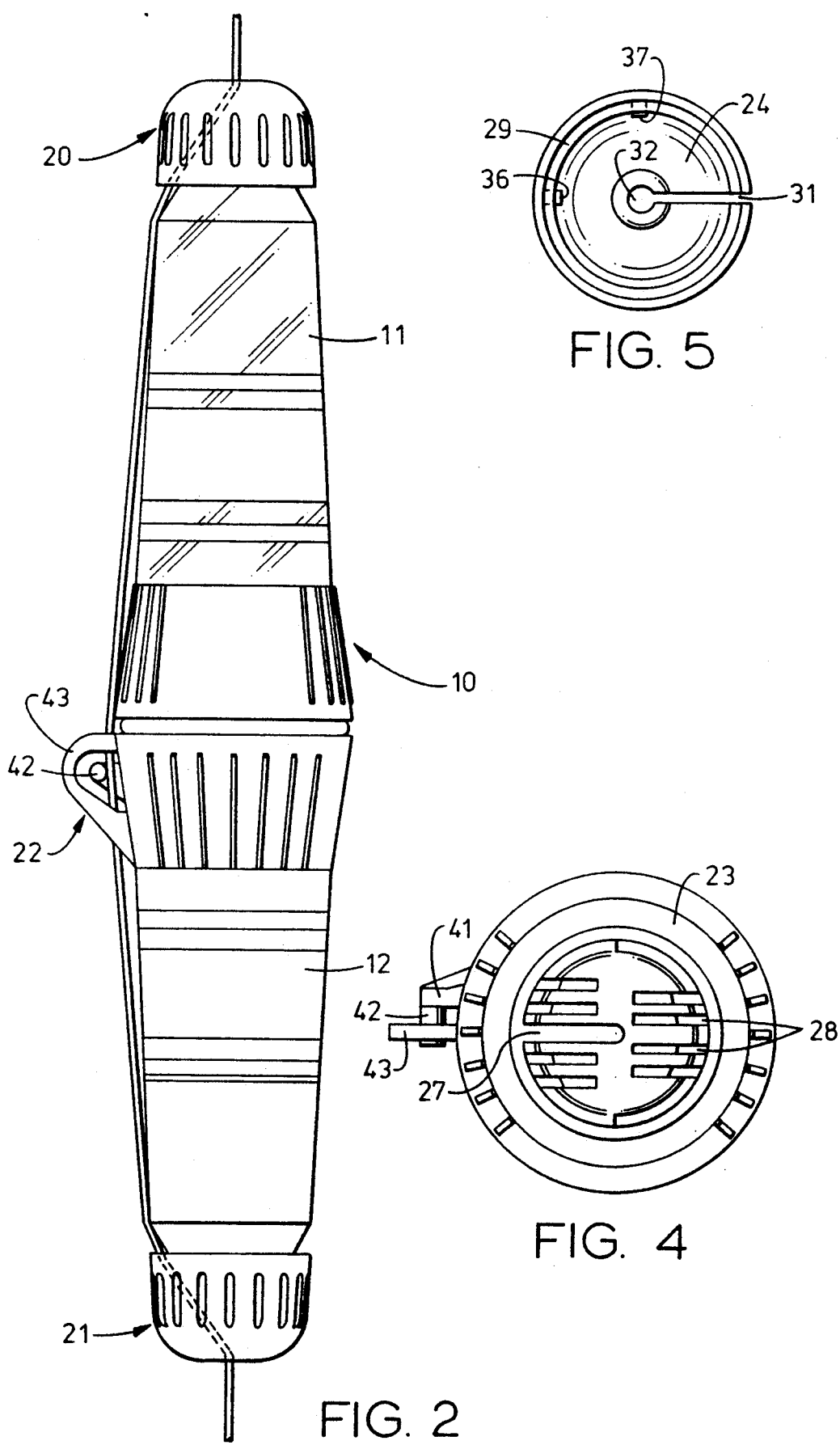
FIG. 2 is an elevational view of an assembled float of this invention.
Figure 3:
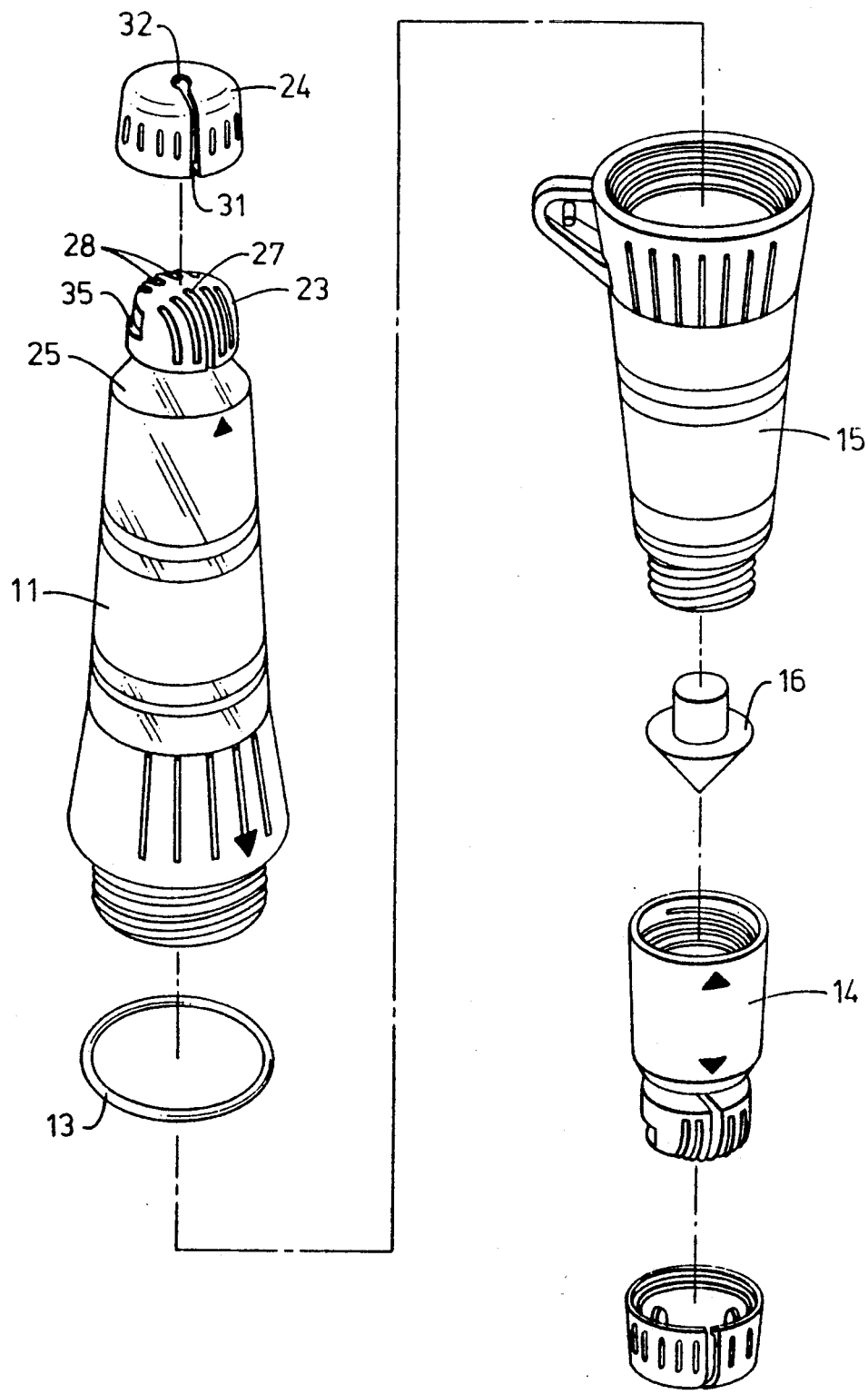
FIG. 3 is an exploded side view of the float of FIG. 2.

A full float 10 is depicted in FIGS. 2 and 3. It has an elongated buoyant body which comprises a top component 11 and a bottom component 12 threadably mated at a mid-point. An 0-ring 13 is used at a threaded connection to ensure a water-tight seal. Each component is made of a plastic and is hollow. A lower compartment 14 on the bottom float component is attached to a shell 15 to form the lower component 11. A weight 16 is dimensioned to fit into the lower compartment 14. Fishing line guide members 20, 21 and 22 are used to hold the float to the fishing line.

The float 10 of FIGS. 2 and 3 has three fishing line guide members. A rounded head at each terminus of the full float's elongated body together with caps represent fishing line guide members 20 and 21 while a loop pin structure 22 at a mid-portion of the elongated body represents the third fishing line guide member. The guide line members are described in detail in the following paragraphs.

The fishing line guide members 20 and 21 found at each terminus of the float 10 are the same in construction. The description to follow describes the elements of the upper guide member 20 and its operation. It should be understood the lower guide member 21 has the same elements and operates in the same manner. The guide member 20 is comprised of a rounded head 23 on the upper terminus of the elongated body 11 and a cooperatively acting cap 24. The rounded head 23 is preferably molded along with the balance of the elongated body, though could be separately made and attached to the elongated body.

The head 23 as shown in FIGS. 3 and 4 is rounded from the crown to a side wall to better receive the cap 24 as described below and to facilitate a twisting motion of the cap 24. A neck 25 is found at the base of the rounded head. The neck is an inwardly tapered recess which terminates a short distance from the side wall of the rounded head. The tapered neck is preferred as a means to hold the cap 24 onto the rounded head 23 and as a means to allow the fishing line to freely slide through the guide member 20 and along the elongated body 11.

A groove 27 extends substantially vertically along the rounded head. "Vertically" is used herein to describe the direction of the groove when the float is in an upright position, i.e. standing on one end. As such, the groove runs in the same direction as the longitudinal axis of the float's elongated body. The groove 27 extends from a center of the crown to the neck. The groove is sufficiently deep to receive the fishing line. As best seen in FIGS. 3 and 4 a series of other grooves 28 also extend vertically along the rounded head. These grooves perform no function in the operation of the float and are present merely to aid in molding of the elongated body and to save raw material.

The cap 24 cooperatively acts with the rounded head 23 to provide a fishing line guide member which has the capability of readily receiving a fishing line in a sliding fashion. The cap 24 has a hollow housing dimensioned to snugly fit over the rounded head, yet allow a twisting motion to revolve it a limited distance around the rounded head. The cap has a slot 31 which extends substantially vertically along the cap from a center hole 32 in the crown to an edge. Its width is sufficient to allow the fishing line to pass through. The slot 31 of the cap is capable of alignment with the groove 27 of the rounded head.

The cap 24 is held on the rounded head in various ways, including clips, etc. Preferably, as shown in FIG. 5, the cap has a peripheral inside rim 29 at its base which snaps over the rounded head and into the narrowed neck. The cap 24 is sufficiently flexible due to its material of construction and its slot to allow a degree of expansion until the peripheral rim slides off the side wall of the head and into the neck. Once positioned, the cap is retained. Yet, the cap is still capable of revolving around the head in response to a twisting motion.

Figure 6:
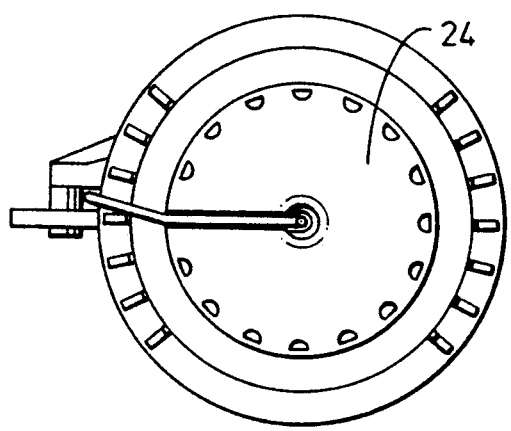
FIG. 6 is a top view of the float of FIG. 2 showing the placement of a fishing line into the float's line guide member.
Figure 7:
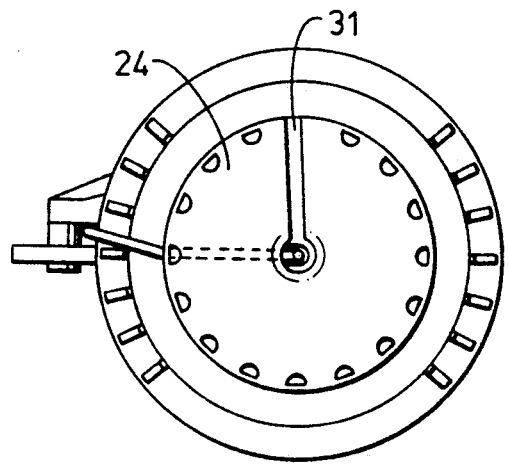
FIG. 7 is the same view as in FIG. 6 with the float's line guide cap member twisted a quarter turn to trap the fishing line.

FIGS. 6 and 7 show the operation of the cap in alignment and non-alignment states. When the cap 24 is positioned on the rounded head 23 of the float 10 and the cap's slot 31 aligned with the rounded head's groove, a fishing line segment is positioned through the slot and into the groove. The line is retained in the groove by merely twisting the cap sufficiently so that the slot and groove are no longer in alignment. The fishing line is trapped in the groove. However, there is adequate groove tolerance that the line is able to slide along the slot center hole, groove and tapered neck.

To ensure that the cap is twisted sufficiently to retain the fishing line, the rounded head 23 and cap 24 have preferred cooperating structural features. As best seen in FIG. 3, the rounded head 23 has an open-topped lateral ramp 35 which extends circumferentially partially around the head. The ramp circumferentially extends from a point about forty-five degrees from the vertical groove to a point about two hundred and seventy degrees from the groove, preferably from about ninety degrees to about two hundred and twenty-five degrees. As evident in FIG. 5, the cap 24 has a boss 36 and a boss 37 on an inside wall positioned to ride on the lateral ramp of the rounded head when assembled. The bosses ride along the ramp until one hits an end wall of the ramp. The user of the float is ensured that the cap is twisted sufficiently when it no longer can move due to the boss and ramp end wall making contact. Twisting the cap in an opposite direction causes the other boss to contact the opposite end wall. In effect, the two bosses restrict movement of the cap in two directions. The two bosses are preferably on the inside wall of the cap about ninety degrees apart and are further placed such that one boss contacts one end wall of the ramp when the slot and groove are in alignment. While the use of the two bosses 36 and 37 on the inside wall of the cap 24 is preferred, a single boss placed on the cap's inside wall to ride on the lateral ramp is sufficient. Ease of alignment of the slot and groove is achieved when the boss contacts an end wall of the ramp when the slot and groove are aligned, though is not required.

Another fishing line guide member of the float is attached to the elongated body 11 in a mid-portion thereof. With reference to FIGS. 2 and 4, a loop pin structure 40 has a bracket 41 extending from near a top edge of the lower component 12 of the elongated body and a rounded pin 42 extending at a substantially horizontal right angle from the bracket 41. An arch-shaped loop 43 extends from the side wall of the elongated body to bridge over the rounded pin 42 with sufficient distance between the loop 43 and pin 42 for a fishing line to easily pass. The pin 42 extends slightly pass the loop 43. A fishing line is readily threaded onto the guide member by forming a small line loop in the fishing line, forcing the line loop through the loop and over the rounded pin. Once properly positioned, the fishing line freely rides over the pin, yet remains thereon due to interference from the loop.

It should be apparent that a full fishing float assembled from the modular components in accordance with this invention can have different combinations of guide members. Thus, one full float has two rounded head/cap guide members. A second full float has a single rounded head/cap guide member and a loop pin structure guide member. A most preferred float is as depicted in FIG. 2 having two rounded head/cap guide members and a loop pin structure guide member. The later float is most preferred because of the wide latitude the fisherman has in rigging the fishing line to the float, all dependent to a certain degree to his fishing preferences. Another full float of the invention has loop pin structures at each terminus thereof.

In operation, the fisherman determines the float length and weight desired based on weather and water conditions. He then chooses a top float component from the modular system and a bottom float component from the system. The two float components are attached, for example by screwing them together to form a full float. If the fisherman determines a change in his float is needed, he merely takes apart the top and bottom float components and substitutes one or both with another component from the respective sets of components.

The invention has been described with particular reference to the drawings. It should be understood other modifications and variations of the described modular fishing float system of the invention can be made. All such changes are considered within the scope of the appended claims.

What is claimed is:

1. A modular fishing float system having a series of interchangeable top float components and bottom float components of varying sizes for assembly together to form a full fishing float with a selected height and weight according to fishing conditions, said system comprised of:

(a) a set of top float components of at least two different lengths wherein each top float component has attaching means to mate a bottom float component; and (b) a set of bottom float components of at least two different lengths wherein each bottom float component has complimentary attaching means to mate the top float component.

2. The modular fishing float system of claim 1 wherein the set of top float components contains three to five components ranging from about one inch to about ten inches in length with an about one inch to about four inches difference in length in each component of the set.

3. The modular float system of claim 2 wherein the set of bottom float components contains three to five components ranging from about one inch to about ten inches in length with an about one inch to about four inches difference in length in each component of the set.

4. The modular float system of claim 3 wherein each top float component has threads and each bottom float component has matching threads so that said top float component and said bottom float component are capable of being threadably mated.

5. The modular float system of claim 1 wherein the bottom float component is capable of containing ballast to cause the assembled full float to sit upright in water.

6. The modular float system of claim 5 wherein at least one of the bottom float components is comprised of a shell mid-portion and a lower compartment attached together and further wherein the lower compartment contains ballast.

7. The modular float system of claim 6 wherein the ballast in the lower compartment is a high density metal shaped to snugly fit within the bottom component to minimize movement therewithin.

8. The modular float system of claim 1 wherein each of the top float components and each of the bottom float components has (i) a rounded head at a terminus end with a groove extending substantially vertically along the head sufficiently deep to receive a fishing line and (ii) a cap dimensioned to fit snugly over the rounded head in a manner which permits said cap to revolve about the rounded head, said cap further having a slot extending substantially vertically from a top center to an edge so as to be capable of alignment with the groove in the underlying rounded head to receive and guide the fishing line into the groove and to retain the line therewithin in a sliding fashion when the cap is revolved to a position wherein the slot in the cap is in non-alignment with the groove in the rounded head.

* * * * *